United States Patent [19]

Pekar, Jr.

[11] 3,902,567
[45] Sept. 2, 1975

[54] NOISE ATTENUATING TRANSMISSION CASING

[75] Inventor: Frank J. Pekar, Jr., Hagerstown, Md.

[73] Assignee: Mack Trucks, Inc., Allentown, Pa.

[22] Filed: Apr. 3, 1974

[21] Appl. No.: 457,416

[52] U.S. Cl.............. 180/70 R; 74/606 R; 60/469; 60/DIG. 10
[51] Int. Cl........................................... B60k 17/00
[58] Field of Search...... 60/469, DIG. 10; 74/606 R; 180/70 R, 64 R

[56] References Cited
UNITED STATES PATENTS 3,139,152  6/1964  Bajer.............................. 180/64 R
3,810,519  5/1974  Galos et al.................. 74/606 R X Primary Examiner—Edgar W. Geoghegan
Attorney, Agent, or Firm—Brumbaugh, Graves, Donohue & Raymond

[57] ABSTRACT

A motor vehicle transmission has a hydraulic pump and a hydraulic motor driven by the pump. A casing encloses both the hydraulic pump and the hydraulic motor and is resiliently mounted on the motor vehicle. As a result, noise produced by the hydraulic pump and hydraulic motor and transmitted to the exterior of the transmission is attenuated. The casing may also enclose gear trains coupled to the pump and to the motor and may be resiliently mounted within a housing for the transmission.

9 Claims, 3 Drawing Figures

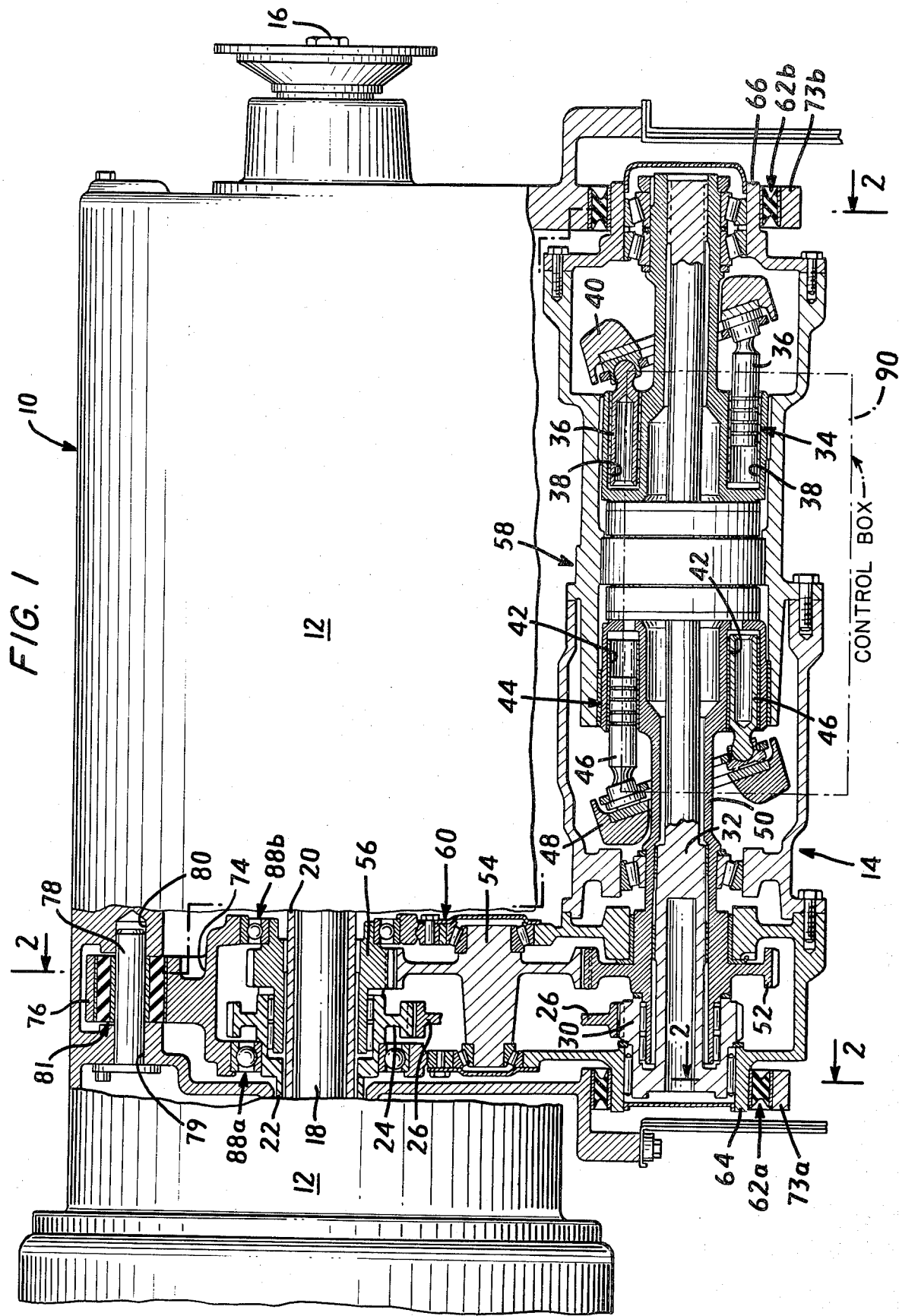

NOISE ATTENUATING TRANSMISSION CASING

BACKGROUND OF THE INVENTION

With increasing emphasis being placed on the reduction of noise produced by the myriad of machines utilized in commerce and industry, efforts are being made to reduce the noise produced by all types of motor vehicles. Such efforts are necessarily directed to quieting the operation of individual vehicle components or systems, such as exhaust systems, cooling systems and transmissions.

Vehicles such as heavy duty trucks require engine transmissions that have high torque multiplication capabilities. Commonly used transmissions satisfying the requirement include infinitely or continuously variable hydrostatic and hydromechanical transmissions. An essential element of a hydrostatic or a hydromechanical transmission is a hydraulic pump and motor combination. During transmission operation, however, the rapid rise and fall of pressure within a hydraulic pump and motor combination produces considerable vibration and noise and contributes substantially to the total amount of noise emanating from a transmission.

While some effort has been directed toward reducing the noise produced by individual elements of a transmission, as illustrated by the flywheel disclosed in the Hayward U.S. Pat. No. 3,362,259 and structured to absorb or dampen low speed vibrations, no suggestion has been made for the reduction or attenuation of the noise produced by a hydraulic pump and motor combination used in a transmission.

SUMMARY OF THE INVENTION

The present invention is directed to apparatus for attenuating the noise produced by a transmission having a hydraulic pump and motor combination. A casing encloses both the hydraulic pump and the hydraulic motor and mounts for the casing resiliently couple it to the motor vehicle. The casing and the mounts effectively isolate the noise and vibration produced by the hydraulic pump and motor from the rest of the transmission and thereby attenuate the noise transmitted exteriorly of the transmission.

In one embodiment of the invention, the transmission includes a pair of gear trains operatively coupled to the hydraulic pump and to the hydraulic motor, respectively. A shaft is engaged with and drives one gear train and another shaft is engaged with and is driven by the other gear train. The casing for the hydraulic pump and motor encloses substantially all of both gear trains and encircles a portion of at least one of the shafts. The shaft or shafts encircled by the casing are also encircled by a bearing assembly or assemblies located between the shafts and the casing. The casing is mounted within the transmission housing.

The resilient elements of the casing mounts preferably have fundamental frequencies less than the emitting frequencies of the hydraulic pump and the hydraulic motor. In addition, the valve housing containing the control valves for the hydraulic pump and motor may be mounted on the exterior of the casing to isolate the control valve noise and vibration from the rest of the transmission.

BRIEF DESCRIPTION OF THE DRAWINGS

For a better understanding of the invention, reference may be made to the following description of two exemplary embodiments, taken in conjunction with the figures of the accompanying drawings, in which:

FIG. 1 is a longitudinal view, partly in section, of a motor vehicle transmission equipped with the noise attenuating casing of the present invention;

DESCRIPTION OF PREFERRED EMBODIMENTS

Figures 2, 3:
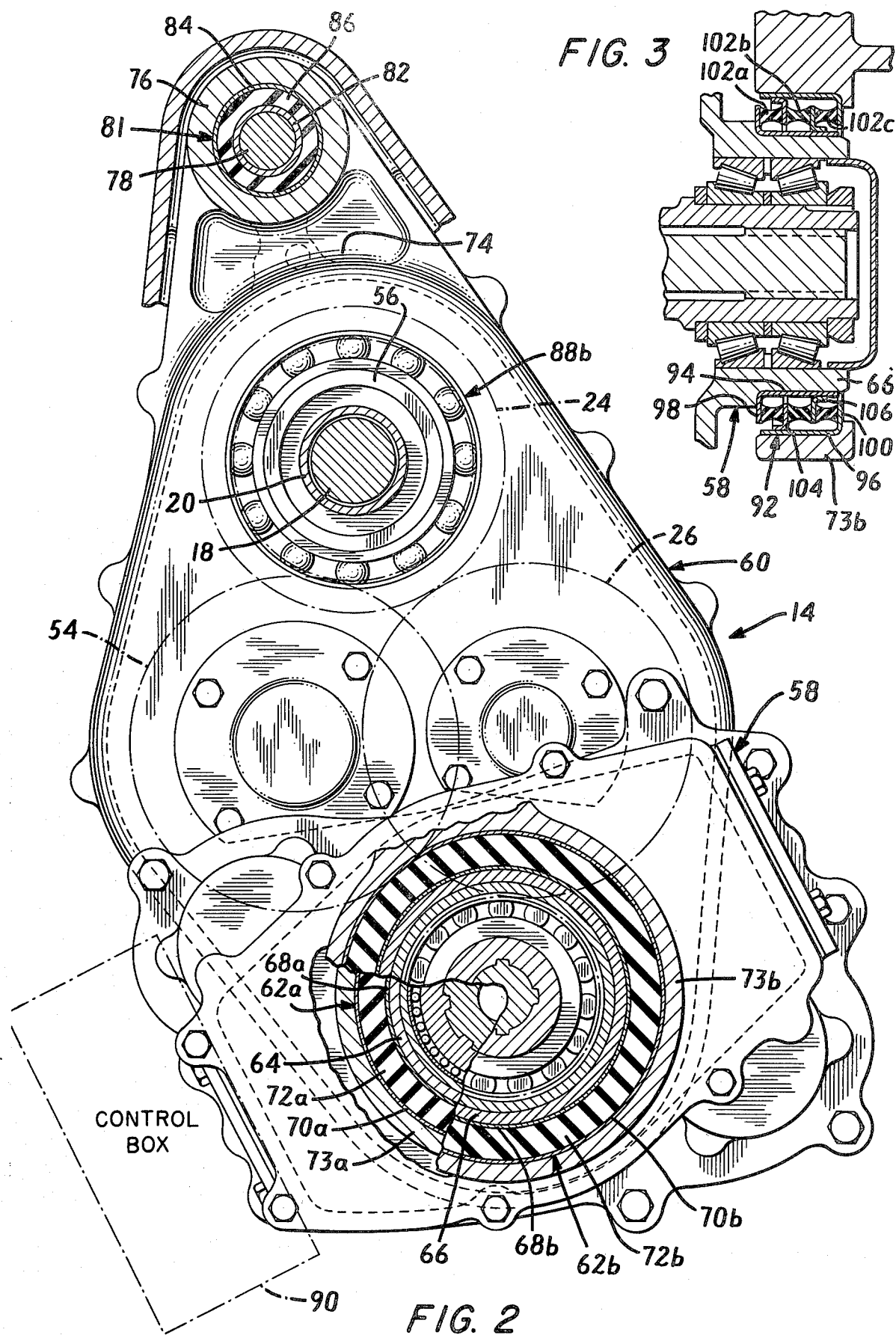
FIG. 2 is a view taken along the line 2—2 of FIG. 1 and looking in the direction of the arrows.
FIG. 3 is a partial longitudinal view, in section, of a motor vehicle transmission equipped with the noise attenuating casing of the invention and a second embodiment of the casing mounts.

FIGS. 1 and 2 of the drawings illustrate a hydromechanical transmission 10 for a motor vehicle, such as a truck having a diesel engine. The transmission 10 is substantially enclosed within a metal housing 12, which has been broken away in FIG. 1 to illustrate the noise attenuating casing 14 of the present invention and the various components of the transmission 10 that are enclosed by the casing. The other components of the transmission 10 are conventional and need not be described in detail for an understanding of the present invention, nor is the operation of the transmission described in detail herein, but reference is made to the Orshansky, Jr. U.S. Pat. No. 3,580,107 for a description and explanation of a typical hydromechanical transmission. The components of the present transmission 10 are not arranged in precise correspondence with the components of the transmissions illustrated in the various figures of the Orshansky patent, but the components are generally similar, as is the operation of the transmission 10. To the extent that the patent describes and illustrates components of a hydromechanical transmission and explains the operation of such a transmission, U.S. Pat. No. 3,580,107 is incorporated herein by reference.

The left end of the transmission 10, as viewed in FIG. 1, is coupled to a prime mover (not shown) and includes an initial planetary gear assembly (not shown but generally corresponding to the planetary assembly 14 illustrated in FIG. 1 of the Orshansky patent). The right end of the transmission 10 includes a plurality of clutches (not shown) for selectively coupling the input from the prime mover to a transmission output shaft 16. The clutches for the transmission 10 utilize clutch plates that are arranged about a central transmission shaft 18.

In the central portion of the transmission 10 shown in FIG. 1, the transmission shaft 18 can be seen extending longitudinally through the transmission. Splined onto the left end (not shown) of the shaft 18 is a ring gear (not shown) for the initial planetary gear assembly (not shown). At its right end, the shaft 18 can be coupled to the output shaft 16 by engaging a selected one or more of the transmission clutches (not shown) corresponding to a desired transmission range. A coaxial hollow shaft 20 encircles the central shaft 18 and is, in turn, encircled by a second hollow coaxial shaft 22. At their left ends, both shafts 20 and 22 mount different sun gears (not shown) for the initial planetary gear assembly. (The hollow shaft 20 may be said to correspond, in operation, to the hollow shaft 26 in FIG. 1 of the Orshansky patent, while the hollow shaft 22 may be said to correspond to the hollow shaft 25 of FIG. 1 of the Orshansky patent).

At its right end, the outer hollow shaft 22 mounts a driving gear 24 that meshes with an intermediate gear 26 rotatably journaled in the noise attenuating casing 14. The intermediate gear 26 engages a gear 30 splined onto the left end of a hydraulic pump shaft 32. The shaft 32 is coupled at its right end to a conventional wobble-type hydraulic pump, generally designated 34. The hydraulic pump 34 includes at least two pistons 36 received in a corresponding plurality of cylinders 38 in the pump for reciprocating motion and a swash plate 40 that holds adjacent ends of the pistons 36.

The cylinders 38 of the hydraulic pump 34 communicate through appropriate passageways (not shown) with corresponding cylinders 42 in a conventional hydraulic motor, generally designated 44. The cylinders 42 receive a plurality of pistons 46 that are connected at adjacent ends to a swash plate 48 for the hydraulic motor 44. The motor 44 also includes a hollow shaft 50 concentric with and encircling the pump shaft 32.

Adjacent its left end, as viewed in FIG. 1, the motor shaft 50 defines an integrally formed gear 52 that meshes with an intermediate gear 54 rotatably journaled in the noise attenuating casing 14. The intermediate gear 54, in turn, engages a driven gear 56 splined onto the intermediate hollow shaft 20 concentric with the central shaft 18. At its right end, the hollow shaft 20 can be coupled through selected transmission clutches (not shown) to the transmission output shaft 16.

In operation, rotational movement of the hollow shaft 22 is transmitted through the gears 24, 26 and 30 and the pump shaft 32 to the pump 34. As the pump 34 rotates, the angular orientation of the swash plate 40 determines the extent of the reciprocating movement of the pump pistons 36. The movement of the pump pistons 36 is transmitted to the motor pistons 46 by the hydraulic fluid flowing through the hydraulic pump 34, the hydraulic motor 44 and the connecting passageways. The reciprocating movement of the motor pistons 46 is translated into rotational movement of the motor 44, which is transmitted through the motor shaft 50 and the gears 52, 54, and 56 to the intermediate hollow shaft 20. The hydraulic pump 34 and the hydraulic motor 44 may both be variable displacement units or one may be a fixed displacement unit and the other a variable displacement unit.

To contain the noise and vibration produced by the hydraulic pump 34, the hydraulic motor 44 and the gears 24, 26, 30, 52, 54 and 56, the casing 14 is arranged to enclose the pump 34, the motor 44 and the associated gears 24–30 and 52–56. As can be seen in FIG. 1, the casing 14 includes a generally tubular lower casing portion 58 and an upper casing portion 60 that rises from the left end of the lower casing portion. As illustrated, the casing 14 comprises several parts that are bolted together where necessary and may, in practice, include considerably more parts than are illustrated. The number of casing parts and their precise configurations are determined by their convenience of production or assembly or the capability of the fabricating apparatus. The shape of the casing is also a matter of convenience and may vary considerably from one transmission to another.

In the illustrated transmission 10, the lower portion 58 of the casing 14 has two annular mounts 62a and 62b press fit onto its left and right ends 64 and 66, respectively. Each mount 62a, 62b includes an inner annular steel sleeve 68a, 68b and an outer annular steel sleeve 70a, 70b separated by a filling of an oil resistant elastomeric material (such as neoprene) 72a, 72b that is bonded to both hands 68a and 70a, 68b and 70b. The two annular mounts 62a, 62b are also press fit into appropriate sockets 73a, 73b formed in the housing 12 for the transmission 10.

At the upper end 74 of the upper portion 60 of the casing 14, the casing portion 60 is configured to provide an eye 76. The eye 76 receives a pin 78 that couples the upper portion 60 of the casing 14 to the transmission housing 12, the ends of the pin 78 being received in a pair of spaced, coaxial bores 79 and 80 formed in the transmission housing. Between the eye 76 and the pin 78 is an annular mount 81, similar to the annular mounts 62a and 62b on the lower casing portion 58. The mount 81 includes two annular sleeves 82 and 84 separated by a filling of elastomeric material 86. The mount 81 is press fit onto the pin 78 and into the eye 76.

Where the casing 14 encircles the shafts 18, 20 and 22, a pair of ball bearing assemblies 88a and 88b encircle the shafts between the shafts and the casing. As can be seen in FIG. 1, the illustrated ball bearing assemblies 88a and 88b contact the casing 14 and specially configured surfaces of the shaft 22 and the driven gear 56, respectively.

In operation, the casing 14 and the annular mounts 62a, 62b and 81 isolate a substantial portion of the noise and vibration produced by the transmission components in the casing 14 from the remainder of the transmission, and thereby attenuate the total noise emanating from the transmission. To enhance the effectiveness of the invention, the elastomeric fillings 72a, 72b and 86 used in the mounts 62a, 62b and 81, respectively, should preferably be selected so that the fundamental suspension frequencies of the mounts are well below the emitting frequencies of the hydraulic pump 34 and the hydraulic motor 44.

As indicated in phantom in FIGS. 1 and 2, the casing 14 may also carry a valve housing 90 for the transmission 10. The valve housing 90 contains the conventional control valves (not shown) for the hydraulic pump 34 and the hydraulic motor 44. By thus mounting the valve housing on the casing 14, the noise and vibration associated with movement of the control valves can be substantially isolated from the remainder of the transmission 10 to further reduce the noise emanating from the transmission.

In FIG. 3, the right end 66 of the lower transmission casing portion 58 is shown equipped with a different annular mount 92. The mount 92 includes inner and outer steel sleeves 94 and 96, respectively, each of which has an upstanding flange 98 and 100, respectively, along one edge. As assembled, the flanges 98 and 100 are spaced apart across the width of the mount 92. Between the flanges 98 and 100 are three rings 102a, 102b and 102c of elastomeric material. One edge of the ring 102a is bonded to the flange 98 and one edge of the ring 102c is bonded to the flange 100. The other edges of the rings 102a and 102c are bonded to flange members 104 and 106, respectively, that are rigidly secured to the steel sleeves 96 and 94, respectively. The two edges of the central ring 102b are bonded one to the flange member 104 and the other to the flange member 106. The mount 92 functions in a manner generally similar to the mount 62b and such a mount 92 may be substituted for any one of the mounts 62a, 62b or 81 of FIGS. 1 and 2.

It will be understood that the embodiments described above are merely exemplary and that persons skilled in the art may make many variations and modifications without departing from the spirit and scope of the invention. For example, the ball bearing assemblies 88a and 88b may be replaced by conventional hydrodynamic bearings or other bearings suitable for preventing transmission of noise or vibration from the casing 14 to the shafts 18, 20 and 22. All such modifications and variations are intended to be within the scope of the invention as defined in the appended claims.

I Claim:

1. In a motor vehicle transmission having a hydraulic pump, a hydraulic motor driven by the hydraulic pump, a first gear train operatively coupled to the hydraulic pump and a second gear train operatively coupled to the hydraulic motor, the improvement comprising casing means enclosing the hydraulic pump, the hydraulic motor and substantially all of the first and second gear trains, and means resiliently mounting the casing means on the motor vehicle, whereby noise produced by the hydraulic pump and the hydraulic motor and transmitted exteriorly of the transmission is attenuated.

2. The improvement of claim 1, wherein the transmission also includes a first shaft engaged with and adapted to drive the first gear train and a second shaft engaged with and adapted to be driven by the second gear train, the first and second shafts being coaxial, and wherein the casing means encircles a portion of at least one of the shafts.

3. The improvement of claim 2, further comprising bearing means encircling said at least one shaft and disposed between the shaft and the casing means.

4. The improvement of claim 1, wherein the transmission also includes a transmission housing and wherein the mounting means resiliently mounts the casing means within the transmission housing.

5. The improvement of claim 1, wherein the mounting means includes at least one resilient member having a fundamental frequency less than emitting frequencies of the hydraulic pump and the hydraulic motor.

6. The improvement of claim 1, wherein the transmission also includes a valve housing containing control valves for the hydraulic pump and the hydraulic motor, and wherein the valve housing is mounted on the casing means.

7. The improvement of claim 1, wherein the mounting means includes at least one mounting member comprising an inner annular sleeve, an outer annular sleeve spaced radially from the inner sleeve and an annular member of elastomeric material interposed between the inner and outer sleeves and bonded to both sleeves.

8. The improvement of claim 1, wherein the mounting means includes at least one mounting member comprising an inner annular sleeve having an annular flange projecting radially outwardly of the inner sleeve, an outer annular sleeve spaced radially from the inner sleeve and having a flange projecting radially inwardly of the outer sleeve and spaced axially from the flange of the inner sleeve, and an annular member of elastomeric material interposed between the flanges of the inner and outer sleeves and bonded to both flanges.

9. In a motor vehicle transmission having a hydraulic pump and a hydraulic motor driven by the hydraulic pump, the improvement comprising casing means enclosing the hydraulic pump and the hydraulic motor, and means resiliently mounting the casing means on the motor vehicle, whereby noise produced by the hydraulic pump and the hydraulic motor and transmitted exteriorly of the transmission is attenuated, the mounting means including at least one mounting member comprising:

a. an inner annular sleeve having an annular flange projecting radially outwardly of the inner sleeve;

b. an outer annular sleeve spaced radially from the inner sleeve and having a flange projecting radially inwardly of the outer sleeve and spaced axially from the flange of the inner sleeve; and c. an annular member of elastomeric material interposed between the flanges of the inner and outer sleeves and bonded to both flanges.

* * * * *